United States Patent
Weiss et al.

(10) Patent No.: US 10,417,113 B1
(45) Date of Patent: Sep. 17, 2019

(54) SYSTEM, METHOD, AND COMPUTER PROGRAM FOR WEB TESTING AND AUTOMATION OFFLINE STORAGE AND ANALYSIS

(71) Applicant: Amdocs Development Limited, Limassol (CY)

(72) Inventors: Yaron Weiss, Champaign, IL (US); Ammar Bhutta, Savoy, IL (US); Svend Akram White, Champaign, IL (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 64 days.

(21) Appl. No.: 15/456,324

(22) Filed: Mar. 10, 2017

Related U.S. Application Data (60) Provisional application No. 62/306,587, filed on Mar. 10, 2016.

(51) Int. Cl.
*G06F 11/00* (2006.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 2201/84* (2013.01)

(58) Field of Classification Search
CPC .............. G06F 11/3612; G06F 11/366; G06F 11/3668; G06F 11/3672; G06F 11/0748; G06F 11/2294
USPC .............................................. 714/38.1, 38.14
See application file for complete search history.

(56) References Cited

U.S. PATENT DOCUMENTS

| | | |
|---|---|---|
| 6,691,250 B1 * | 2/2004 | Chandiramani ...... G06F 11/079 714/15 |
| 7,272,782 B2 | 9/2007 | Sneh |
| 7,370,066 B1 | 5/2008 | Sikchi et al. |
| 7,617,486 B2 | 11/2009 | Sharma et al. |
| 7,814,234 B2 | 10/2010 | Hawkins et al. |
| 7,860,842 B2 | 12/2010 | Bronnikov et al. |
| 8,392,890 B2 | 3/2013 | Miller |

(Continued)

FOREIGN PATENT DOCUMENTS

| | | |
|---|---|---|
| CN | 101615159 B | 3/2011 |
| CN | 103412817 A | 11/2013 |

(Continued)

*Primary Examiner* — Sarai E Butler
(74) *Attorney, Agent, or Firm* — Zilka-Kotab, P.C.

(57) ABSTRACT

A system, method, and computer program product are provided for web testing and automation offline storage and analysis. In operation, an automated testing flow of a system under test is monitored by a testing system. Further, an instruction is received by the testing system to capture a snapshot of the system under test during the automated testing flow of the system under test. In response to receiving the instruction to capture the snapshot of the system under test, a complete snapshot of the system under test is saved by the testing system. The complete snapshot includes an appearance of the system under test, digital assets being utilized in association with the automated testing flow of the system under test, and current code associated with the automated testing flow of the system under test, such that full client-side functionality of the system under test is available to a tester offline.

18 Claims, 5 Drawing Sheets

(56) References Cited

U.S. PATENT DOCUMENTS

| | | | |
|---|---|---|---|
| 8,689,052 B2 | 4/2014 | Prophete et al. | |
| 8,776,023 B2 | 7/2014 | LeSuer et al. | |
| 10,210,073 B1* | 2/2019 | Baruch | G06F 11/3664 |
| 2005/0055603 A1* | 3/2005 | Soran | G06F 3/0608 |
| | | | 714/6.32 |
| 2010/0174522 A1* | 7/2010 | Stunkel | G01R 31/008 |
| | | | 703/17 |
| 2011/0314343 A1* | 12/2011 | Hoke | G06F 11/3672 |
| | | | 714/45 |
| 2012/0036580 A1 | 2/2012 | Gorny et al. | |
| 2013/0117232 A1* | 5/2013 | Lee | G06F 17/303 |
| | | | 707/639 |
| 2013/0283140 A1* | 10/2013 | Wu | G06F 17/30864 |
| | | | 715/207 |
| 2013/0311977 A1 | 11/2013 | Nieminen et al. | |
| 2014/0304588 A1 | 10/2014 | Li et al. | |
| 2017/0237792 A1* | 8/2017 | Taghavi | H04L 65/602 |
| | | | 709/219 |
| 2017/0277625 A1* | 9/2017 | Shtuchkin | G06F 11/3688 |

FOREIGN PATENT DOCUMENTS

| | | |
|---|---|---|
| CN | 103902447 A | 7/2014 |
| WO | 2014041561 A2 | 3/2014 |
| WO | 2014159808 A1 | 10/2014 |
| WO | 2015073761 A2 | 5/2015 |

* cited by examiner

SYSTEM, METHOD, AND COMPUTER PROGRAM FOR WEB TESTING AND AUTOMATION OFFLINE STORAGE AND ANALYSIS

CLAIM OF PRIORITY

This application claims the benefit of U.S. Provisional Application No. 62/306,587, filed Mar. 10, 2016, the entire contents of which are incorporated herein by reference.

FIELD OF THE INVENTION

The present invention relates to software testing, and more particularly to providing offline storage and analysis in the context of web testing and automation.

BACKGROUND

Software applications sometimes go offline unexpectedly, either fully or partially, and software state views always contain more data than that is tested in any given test. When test automation development is still underway for a given system under test (SUT), such unexpected downtime can present acute problems by holding up work and preventing incremental progress.

Also, even when the system under test is up and fully available, there are situations where it would be inefficient for a tester to walk through an entire test flow on the live application merely in order to examine some aspect of a particular page/activity. Finally, collections of tests or their systems under test often have qualities or considerations that do not become evident until tests' data have been examined in aggregate. In such cases, storing representations of and simulating system under test behavior offline can be very useful.

There is thus a need for addressing these and/or other issues associated with the prior art.

SUMMARY

A system, method, and computer program product are provided for web testing and automation offline storage and analysis. In operation, an automated testing flow of a system under test is monitored by a testing system. Further, an instruction is received by the testing system to capture a snapshot of the system under test during the automated testing flow of the system under test. In response to receiving the instruction to capture the snapshot of the system under test, a complete snapshot of the system under test is saved by the testing system. The complete snapshot includes an appearance of the system under test, digital assets being utilized in association with the automated testing flow of the system under test, and current code associated with the automated testing flow of the system under test, such that full client-side functionality of the system under test is available to a tester offline.

DETAILED DESCRIPTION

Figure 1:
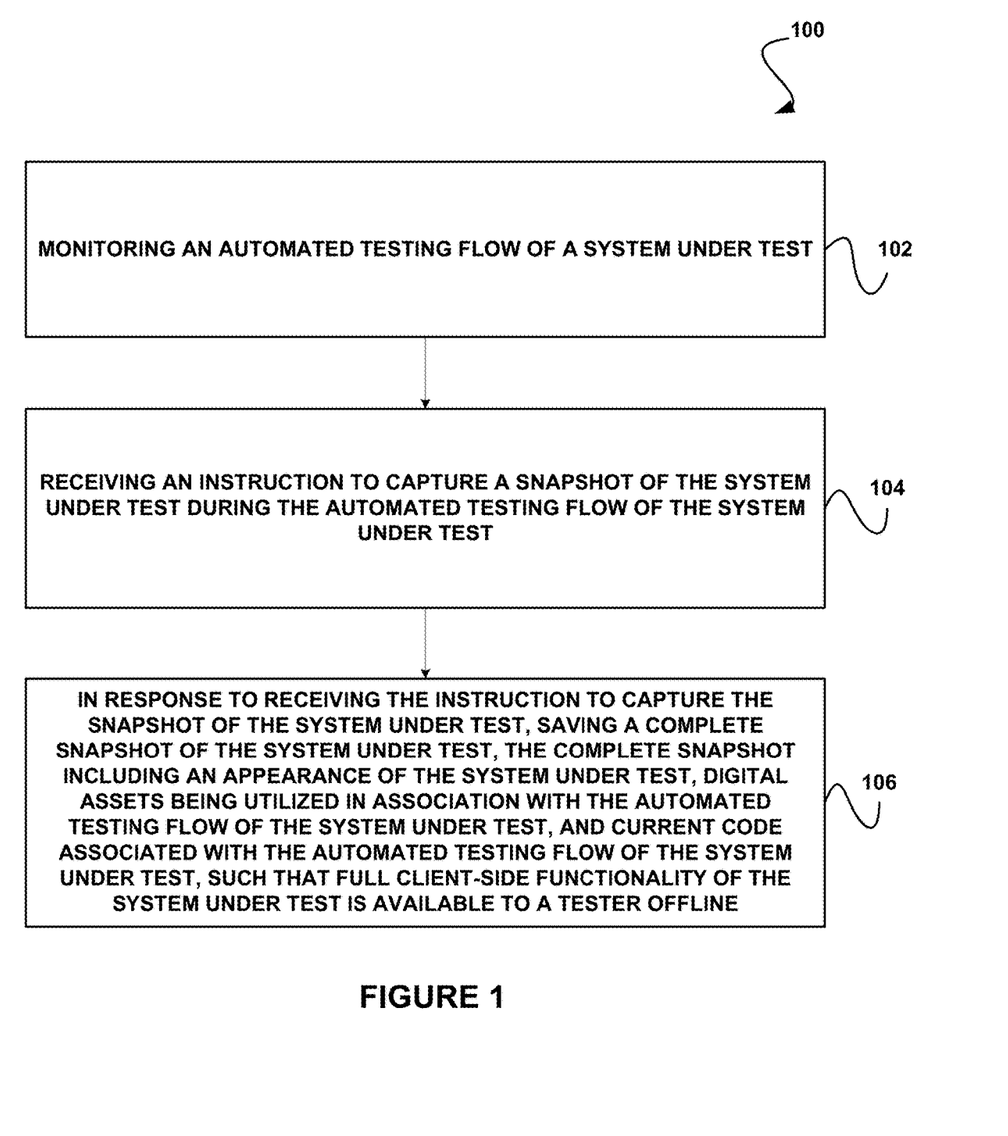
FIG. 1 illustrates a method for web testing and automation offline storage and analysis, in accordance with one embodiment.

FIG. 1 illustrates a method 100 for web testing and automation offline storage and analysis, in accordance with one embodiment.

In operation, an automated testing flow of a system under test is monitored by a testing system. See operation 102. The system under test may include various hardware, software, and/or computer code, etc. The testing system may include any system monitoring the system under test. The testing flow may include one or more tests being performed on the system under test (e.g. automatically, etc.).

Further, an instruction is received by the testing system to capture a snapshot of the system under test during the automated testing flow of the system under test. See operation 104. The instruction may be received from a user and/or an automatic instruction (e.g. based on criteria, timing, actions, etc.).

In one embodiment, the instruction may be triggered by a user in response to the user selecting a "record" option, or the like, on a user interface associated with the testing system. In another embodiment, the instruction may be triggered based on specific actions or changes made to the system under test. Of course, various criteria may be used to trigger the instruction.

Additionally, in one embodiment, the instruction may include specific indications of what aspects of the system under test to record. For example, the instruction to capture the snapshot of the system under test may include an indication of user-defined choices on a page to be automatically converted into variables in a test script. In this case, the user (e.g. the tester, etc.) may indicate the choices utilizing a user interface associated with the testing system.

In response to receiving the instruction to capture the snapshot of the system under test, the testing system saves a complete snapshot of the system under test. See operation 106. The complete snapshot includes an appearance of the system under test, digital assets being utilized in association with the automated testing flow of the system under test, and current code associated with the automated testing flow of the system under test, such that full client-side functionality of the system under test is available to a tester offline (e.g. in one or more databases, systems, the testing system, etc.).

The appearance of the system under test includes a structure of the system under test, which may include a description of how the system under test interacts/interfaces with other systems, components, etc. The digital assets may include any files, repositories, etc., being utilized or accessed by the system under test. The current code may include all code being utilized by the system under test.

In various embodiments, the complete snapshot may include various combinations of data (e.g. as determined by the testing implementation, a tester, etc.). For example, in one embodiment, saving the complete snapshot of the system under test may include automatic recording of a plurality of snapshots of the testing flow such that the tester can replay a test offline from an end to end perspective.

Further, in one embodiment, saving the complete snapshot of the system under test may include capturing all page elements corresponding to one or more pages associated with the automated testing flow of the system under test. In this case, the captured page elements may be available to the tester offline for modification as part of the complete snapshot of the system under test.

In any case, the testing system may implement the method 100 such that an accurate and reliable facsimile of the system under test at a particular point in a testing flow is preserved. This means that all page elements may be captured for future reference in the snapshot, such that the tester has the option, when working offline, to modify page element selections.

It should also be noted that the method 100 may be implemented utilizing various hardware, software, applications, user interfaces, etc., as dictated by the implementer. For example, the testing system may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Software applications sometimes go offline unexpectedly, either fully or partially, and software state view always contain more data than that is tested in any given test. When test automation development is still underway for a given system under test (SUT), such unexpected downtime can present acute problems by holding up work and preventing incremental progress. Also, even when the system under test is up and fully available, there are situations where it would be inefficient for a tester to walk through an entire test flow on the live application merely in order to examine some aspect of a particular page/activity. Finally, collections of tests or their systems under test often have qualities or considerations that do not become evident until tests' data have been examined in aggregate. In such cases, storing representations of and simulating system under test behavior offline can be very useful.

The systems and methodology described herein address that need through strategic and pro-active storage of application data for use in offline testing and automation. Such systems and methodology offer a solution to tackle the critical challenge of developing automation in an offline mode to reduce time to market and enhance productivity, especially during challenging software development environment down times and application instability. The solution described herein caters to both offline storage of data and reproduction of that data for automation development in its exact form and contents, rather than use of simulators or wireframes. The solution described herein caters to Web, desktop applications, and mobile devices in a similar fashion.

Figure 2:
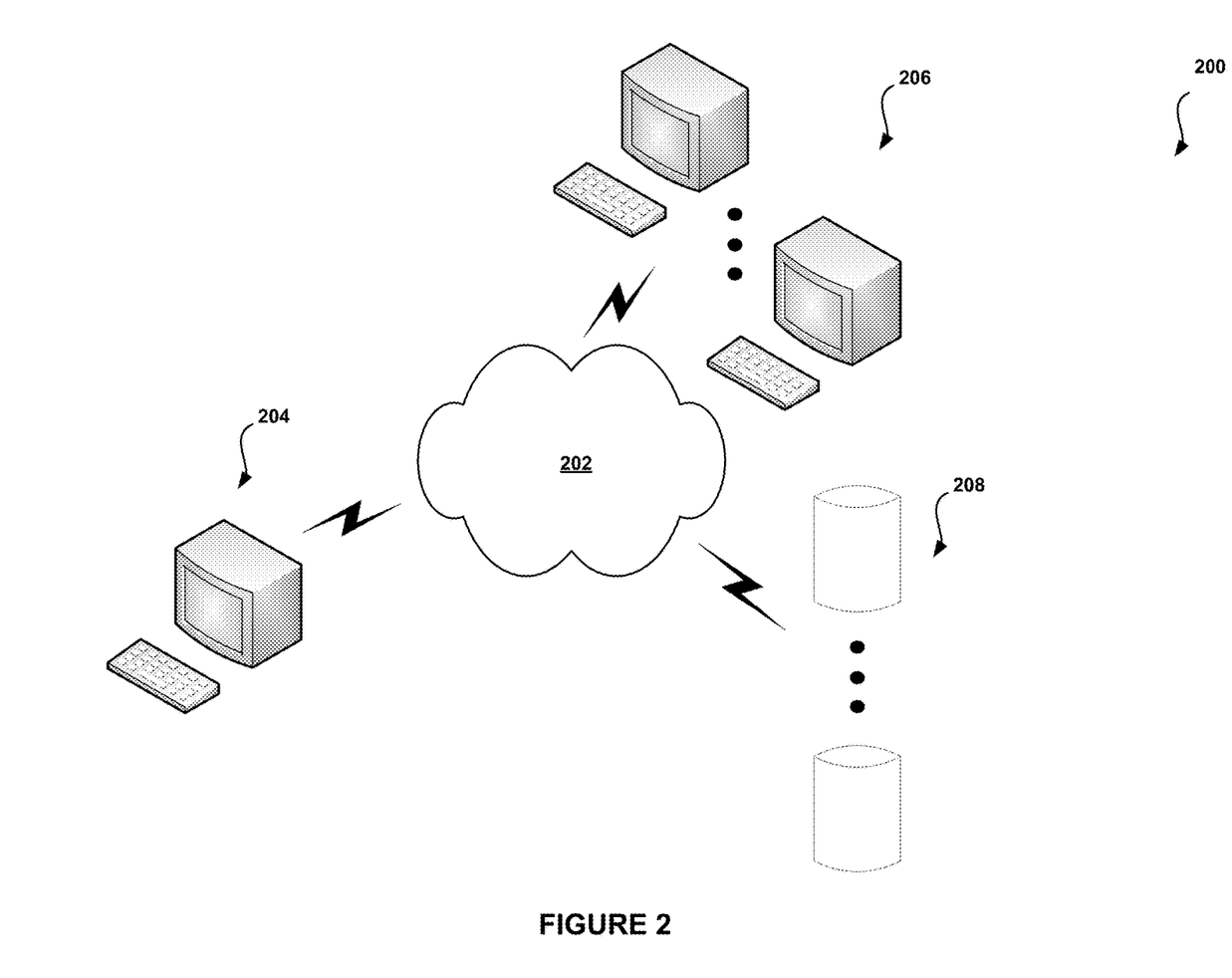
FIG. 2 shows a system diagram for web testing and automation offline storage and analysis, in accordance with one embodiment.

FIG. 2 shows a system 200 for web testing and automation offline storage and analysis, in accordance with one embodiment. As an option, the system 200 may be implemented in the context of the details of FIG. 1 and/or any subsequent figure(s). Of course, however, the system 200 may be implemented in the context of any desired environment. Further, the aforementioned definitions may equally apply to the description below.

As shown, the system 200 includes a testing system 204, which may implement a variety of applications or software, etc. The testing system 204 is capable of communicating with one or more systems under test 206, either directly or over one or more networks 202, for performing web testing and automation offline storage and analysis.

The testing system 204 is also in communication with one or more repositories/databases 208, which may serve as a storage areas for captured snapshots of the systems under test 206 and associated information. The repositories/databases 208 may be local, networked, or owned by a third party.

The testing system 204 provides testers the option to save a complete snapshot of a test at a given moment during an automated testing flow. This snapshot captures the appearance of the system under test, all digital assets in use, and its underlying code at that specific moment, so that the page's full client-side functionality is available to the tester offline/when the environment or application is down.

An accurate and reliable facsimile of the system under test at the point in the testing flow is preserved. This means that all page elements are captured for future reference in the snapshot so that the tester has the option, when working offline, to modify their page element selection method (e.g. switching from the HTML ID to XPath locator for web elements, etc.). Likewise, the tester has the option of further refining (e.g. adding additional parsing to a validation, etc.) or choosing a new page element to validate (e.g. another cell in a table, etc.).

The testing system 204 allows for automated parameter capture of the system under test. In order to streamline test script/automation development, in one embodiment, the user can choose from user-defined choices on a page to be automatically converted into variables in the test script, rather than captured as hardcoded user input.

The testing system 204 also allows for offline flow simulation. The testing system 204 encompasses the automatic recording of snapshots of a testing flow so that a tester can "replay" the test offline from end to end perspective. This is useful for situations where a user needs to review the testing solution test but the system under test is offline, or if running the real test on the system under test is unnecessarily time-consuming for the task at hand (e.g. if the user merely needs to test some aspect of the client-side scripting of the application in the middle of a lengthy test flow, etc.).

To record snapshots effectively and efficiently, the testing system 204 examines user actions (or script actions) in order to organize their data appropriately. Transitional user interface actions and events are tracked and acted upon by the testing system in order to group test objects efficiently and in a user-friendly manner. For example, if a button is clicked on a form/page and a new page is loaded, the preceding actions may be grouped into a logical activity. Similarly, if a link on a page is clicked and this causes a new page to be loaded or for significant structural changes to be made to the current page, then those actions may be grouped.

Figure 3:
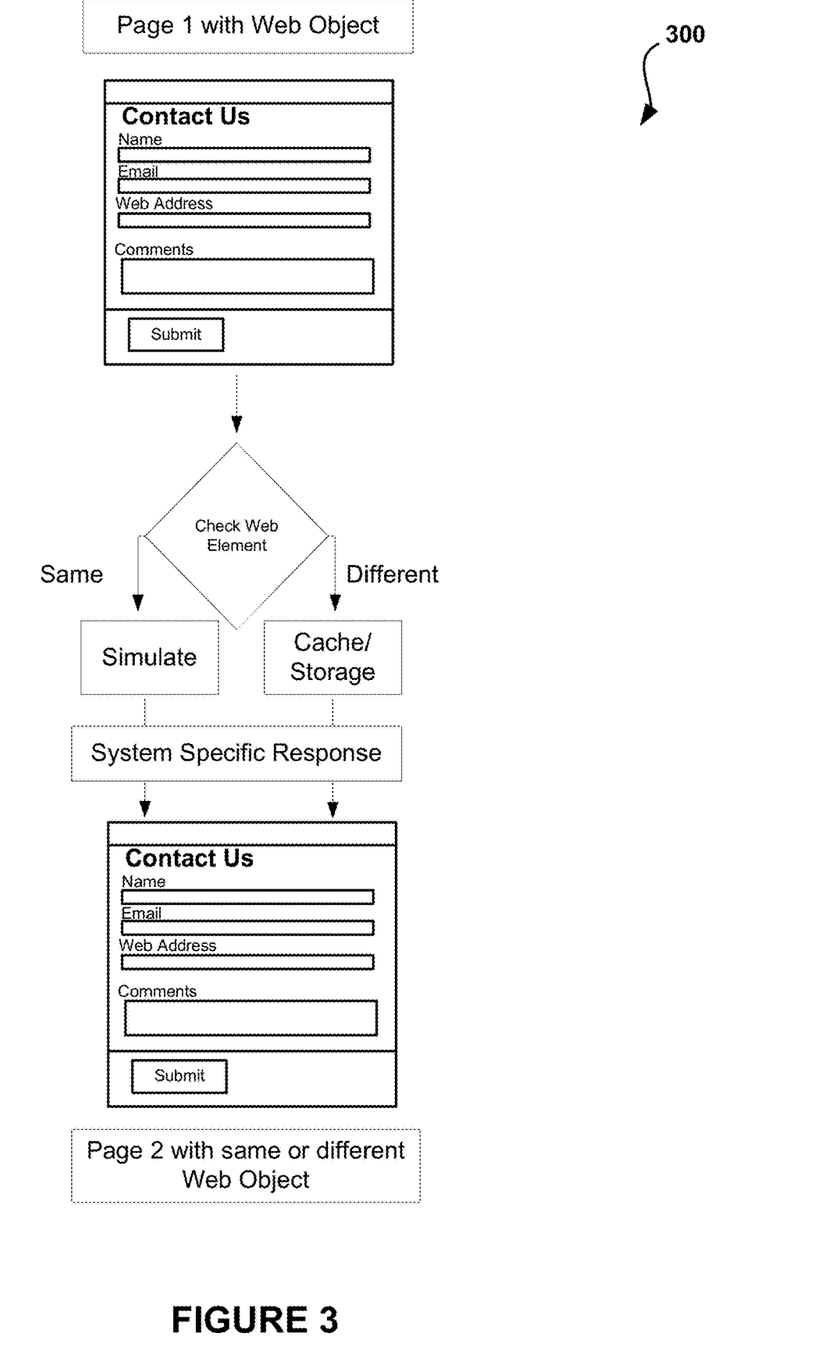
FIG. 3 shows a data flow diagram example of a web component for web testing and automation offline storage and analysis, in accordance with one embodiment.

FIG. 3 shows a data flow diagram example 300 of a web component for web testing and automation offline storage and analysis, in accordance with one embodiment. As an option, the example 300 may be implemented in the context of the details of the previous figures and/or any subsequent figure(s). Of course, however, the example 300 may be implemented in the context of any desired environment. Further, the aforementioned definitions may equally apply to the description below.

The data flow diagram example 300 illustrates at a high level the process through which offline snapshots are kept up to date with changes in the system under test. During online test executions the system under test's behavior is monitored and compared to previous executions to determine what, if anything has changed. In cases where something has changed, whether on the user interface level or in application behavior, the corresponding snapshot(s) are updated or added accordingly.

An algorithm is employed by the testing system to determine the significance of any change detected and what, if any, actions should be performed as a result. For example, if a previously recorded locator for a user interface element changes (e.g. a text field's ID property changing from "txtFirstName" to "txtFirstname", etc.), or if the system under test's response to a particular user action has changed, the corresponding snapshot is updated to reflect the new values and/or behavior. If entirely new page elements and/or responses are detected, they likewise are captured and added to the snapshots. Complete sets of snapshots may be versioned for future reference (e.g. troubleshooting, analytics, etc.).

In cases where the algorithm determines that changes appear to represent a new sub-flow (e.g. if choosing "create new account" instead of "use existing account" launches an extra screen, etc.), this sub-flow is captured and the conditions that produce it are noted. Branching and reuse of existing snapshot flows may be done as necessary to avoid redundancy and maximize reuse potential.

With respect to code analysis, in one embodiment, the user can opt to automatically save snapshots of all steps of a test flow, whether run manually or scripted. This makes possible a variety of types of offline analysis.

One possible example is that patterns in object names could be assessed to determine the most efficient approach to choose global variables. It can also be used to identify "brittle" aspects of the application that are likely to change and break future tests, if tested with static data, for the system under test.

The testing system also provides the capability to audit in order to flag browser-specific code, client-side security vulnerabilities (e.g. Cross-Site Scripting, SQL injection, etc.), design inconsistencies between releases, or other non-best practices (e.g. HTML frames, non-Section 508 compliant pages, etc.).

The testing system also provides the possibility that analytical data across multiple tests, applications, environments and/or projects could be generated to improve the overall testing process and identify new automation areas.

Figure 4:
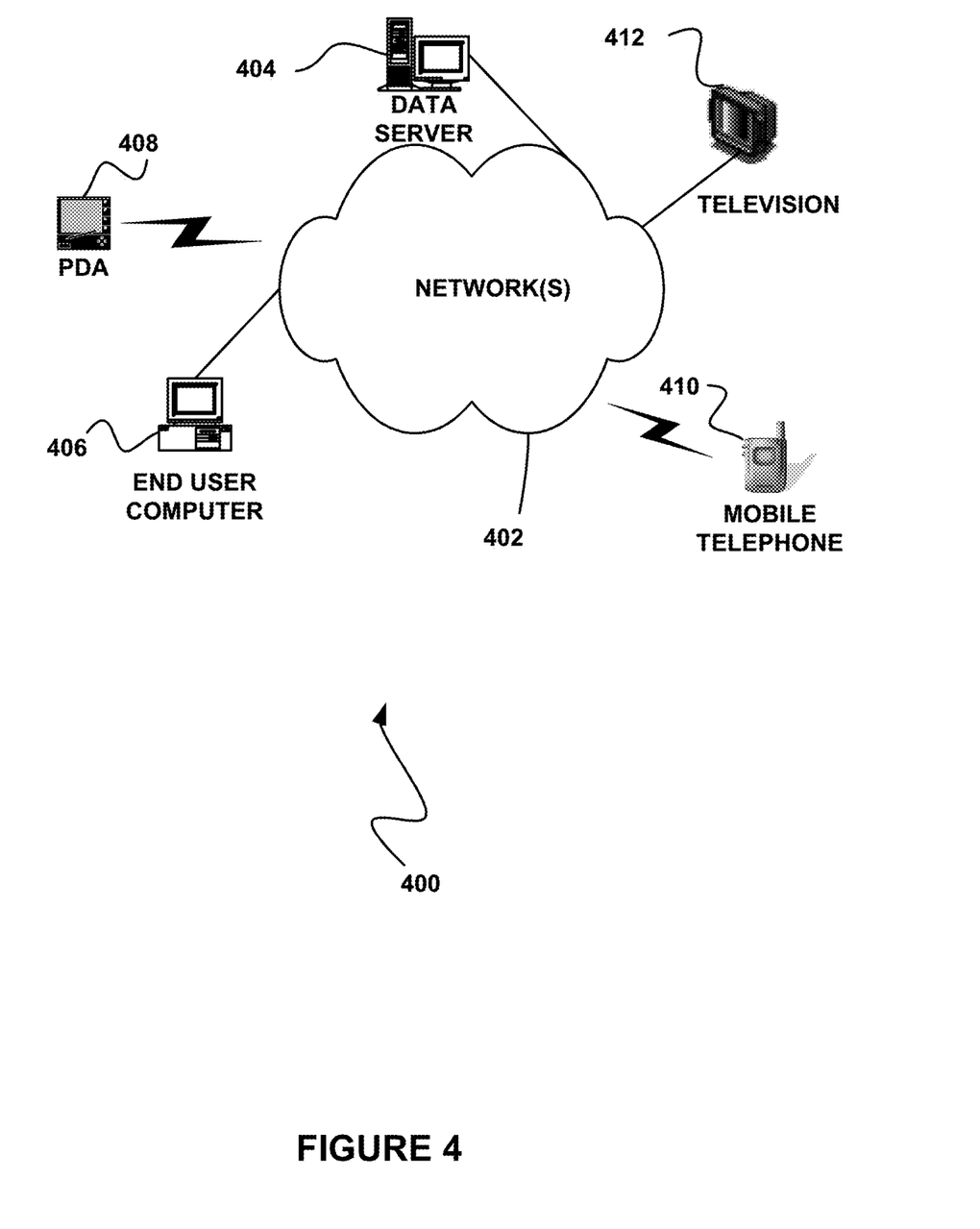
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, laptop computer, and/or any other type of logic. Still yet, various other devices may be coupled to the network 402 including a personal digital assistant (PDA) device 408, a mobile phone device 410, a television 412, etc.

Figure 5:
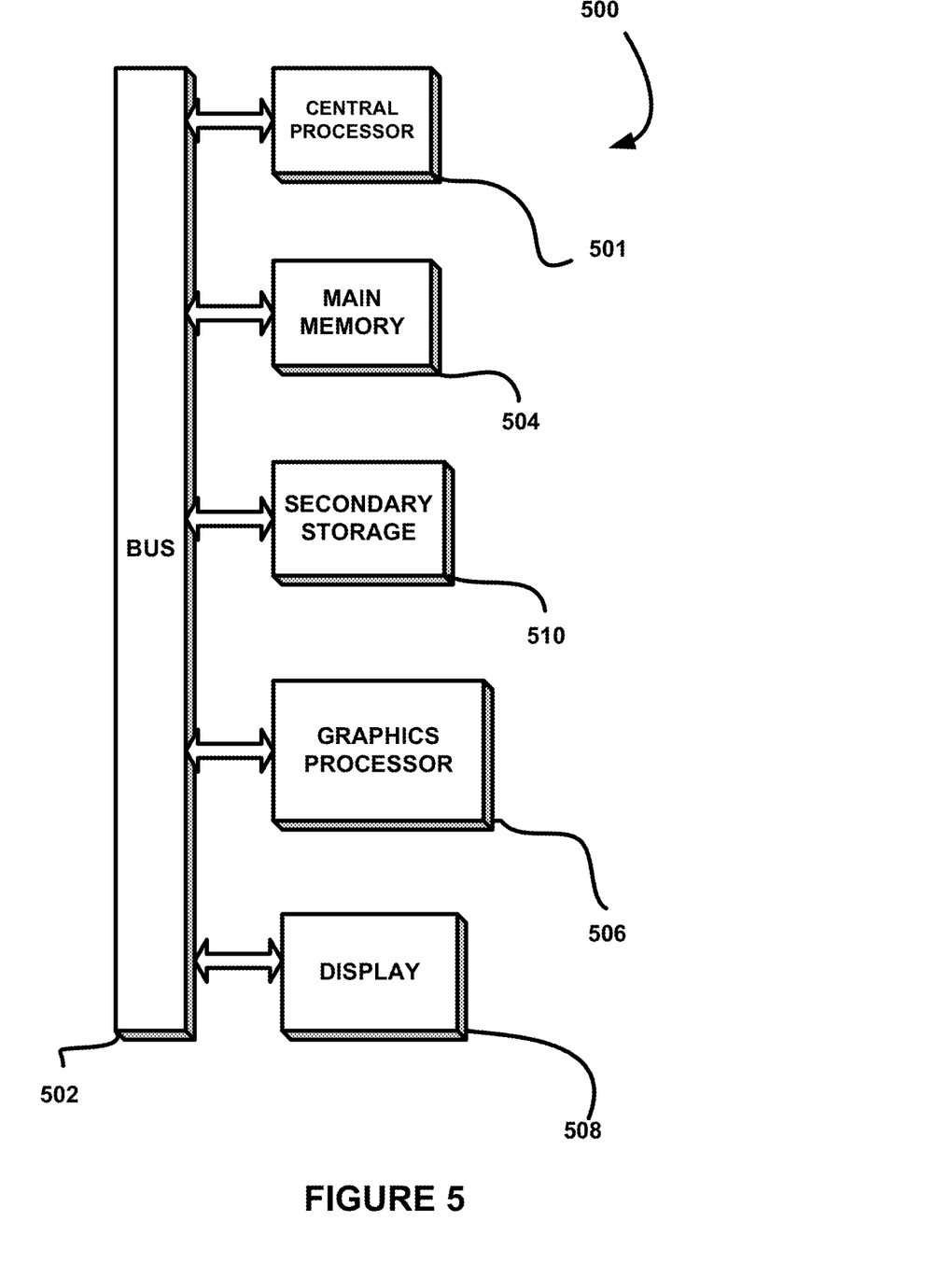
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 (e.g. random access memory [RAM], etc.). The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   monitoring, by a testing system, an automated testing flow of a system under test, the automated testing flow including one or more tests being performed on the system under test while the system under test is online;
   receiving, by the testing system, an instruction to capture a snapshot of the system under test during the automated testing flow of the system under test;
   in response to receiving the instruction to capture the snapshot of the system under test, recording, by the testing system, a complete snapshot of the system under test, the complete snapshot including an appearance of the system under test, digital assets being utilized in association with the automated testing flow of the system under test, and current code associated with the automated testing flow of the system under test, such that full client-side functionality of the system under test is available to a tester offline;
   receiving, by the testing system, a request to replay the complete snapshot recorded by the testing system;
   responsive to the request, replaying, by the testing system, the complete snapshot recorded by the testing system; and
   repeating the monitoring, receiving, and recording for at least one additional automated testing flow of the system under test to record an additional complete snapshot of the system under test;
   wherein the additional complete snapshot of the system under test is stored as branch to the complete snapshot of the system under test when changes determined between the complete snapshot of the system under test and the additional complete snapshot of the system under test represent a new sub-flow for the system under test.

2. The method of claim 1, wherein the instruction to capture the snapshot of the system under test includes an automatic instruction.

3. The method of claim 1, wherein the instruction to capture the snapshot of the system under test includes an instruction received from a user.

4. The method of claim 1, wherein the instruction to capture the snapshot of the system under test includes an indication of user-defined choices on a page to be automatically converted into variables in a test script.

5. The method of claim 1, wherein recording the complete snapshot of the system under test includes capturing all page elements corresponding to one or more pages associated with the automated testing flow of the system under test.

6. The method of claim 5, wherein the captured page elements are available to the tester offline for modification as part of the complete snapshot of the system under test.

7. The method of claim 1, wherein recording the complete snapshot of the system under test includes capturing user-defined choices on a page and automatically converting the user-defined choices into variables for use in generating a test script.

8. A computer program product embodied on a non-transitory computer readable medium, comprising computer code for:
- monitoring, by a testing system, an automated testing flow of a system under test, the automated testing flow including one or more tests being performed on the system under test while the system under test is online;
- receiving, by the testing system, an instruction to capture a snapshot of the system under test during the automated testing flow of the system under test;
- in response to receiving the instruction to capture the snapshot of the system under test, recording, by the testing system, a complete snapshot of the system under test, the complete snapshot including an appearance of the system under test, digital assets being utilized in association with the automated testing flow of the system under test, and current code associated with the automated testing flow of the system under test, such that full client-side functionality of the system under test is available to a tester offline;
- receiving, by the testing system, a request to replay the complete snapshot recorded by the testing system;
- responsive to the request, replaying, by the testing system, the complete snapshot recorded by the testing system; and
- repeating the monitoring, receiving, and recording for at least one additional automated testing flow of the system under test to record an additional complete snapshot of the system under test;
- wherein the additional complete snapshot of the system under test is stored as branch to the complete snapshot of the system under test when changes determined between the complete snapshot of the system under test and the additional complete snapshot of the system under test represent a new sub-flow for the system under test.

9. The computer program product of claim 8, wherein the instruction to capture the snapshot of the system under test includes an automatic instruction.

10. The computer program product of claim 8, wherein the instruction to capture the snapshot of the system under test includes an instruction received from a user.

11. The computer program product of claim 8, wherein the instruction to capture the snapshot of the system under test includes an indication of user-defined choices on a page to be automatically converted into variables in a test script.

12. The computer program product of claim 8, wherein recording the complete snapshot of the system under test includes capturing all page elements corresponding to one or more pages associated with the automated testing flow of the system under test.

13. The computer program product of claim 12, wherein the captured page elements are available to the tester offline for modification as part of the complete snapshot of the system under test.

14. A testing system comprising one or more processors operable for:
- monitoring, by the testing system, an automated testing flow of a system under test, the automated testing flow including one or more tests being performed on the system under test while the system under test is online;
- receiving, by the testing system, an instruction to capture a snapshot of the system under test during the automated testing flow of the system under test;
- in response to receiving the instruction to capture the snapshot of the system under test, recording, by the testing system, a complete snapshot of the system under test, the complete snapshot including an appearance of the system under test, digital assets being utilized in association with the automated testing flow of the system under test, and current code associated with the automated testing flow of the system under test, such that full client-side functionality of the system under test is available to a tester offline;
- receiving, by the testing system, a request to replay the complete snapshot recorded by the testing system;
- responsive to the request, replaying, by the testing system, the complete snapshot recorded by the testing system; and
- repeating the monitoring, receiving, and recording for at least one additional automated testing flow of the system under test to record an additional complete snapshot of the system under test;
- wherein the additional complete snapshot of the system under test is stored as branch to the complete snapshot of the system under test when changes determined between the complete snapshot of the system under test and the additional complete snapshot of the system under test represent a new sub-flow for the system under test.

15. The system of claim 14, wherein the instruction to capture the snapshot of the system under test includes an automatic instruction.

16. The system of claim 14, wherein the instruction to capture the snapshot of the system under test includes an instruction received from a user.

17. The system of claim 14, wherein the instruction to capture the snapshot of the system under test includes an indication of user-defined choices on a page to be automatically converted into variables in a test script.

18. The system of claim 14, wherein recording the complete snapshot of the system under test includes capturing all page elements corresponding to one or more pages associated with the automated testing flow of the system under test.

* * * * *